United States Patent [19]
Rooklyn

[11] 4,235,559
[45] Nov. 25, 1980

[54] CONSTRUCTION OF METAL ARTICLES
[75] Inventor: Jack Rooklyn, Burbank, Calif.
[73] Assignee: Industrial Management Company, Calif.
[21] Appl. No.: 48,347
[22] Filed: Jun. 14, 1979
[51] Int. Cl.³ ............................................. F16B 12/46
[52] U.S. Cl. ..................................... 403/262; 403/171
[58] Field of Search .............. 403/260, 262, 231, 217, 403/172, 171, 176, 230

[56] References Cited

U.S. PATENT DOCUMENTS

| | | | |
|---|---|---|---|
| 1,240,390 | 9/1917 | Uhl | 108/155 |
| 1,776,534 | 9/1930 | Allen | 248/188 X |
| 1,867,226 | 7/1932 | Martin | 403/262 |
| 3,341,160 | 9/1967 | Jones | 248/188.8 X |
| 3,754,728 | 8/1973 | Bowman | 108/156 X |
| 3,837,754 | 9/1974 | Malcik | 403/217 |
| 4,093,167 | 6/1978 | Rooklyn | 403/231 X |

FOREIGN PATENT DOCUMENTS 1497532  1/1978  United Kingdom ..................... 403/260

Primary Examiner—Andrew V. Kundrat
Attorney, Agent, or Firm—Herzig & Walsch, Incorporated

[57] ABSTRACT

The invention relates to the construction of metal articles such as work benches, pallet racks, etc., by way of example. In a typical construction upright hollow metal legs are secured to a flat table or platform surface. The upright members or legs preferably may be square in cross section. The upper ends of the legs are secured to mutually perpendicular transverse members which in turn are secured to the flat platform surface. The transverse members are preferably channel shaped with side flanges. An end plug or fitting is inserted into the upper end of each leg, the fitting being tapped to receive stud bolts. The ends of the transverse members are secured to the legs and the end plugs by stud bolts.

7 Claims, 4 Drawing Figures

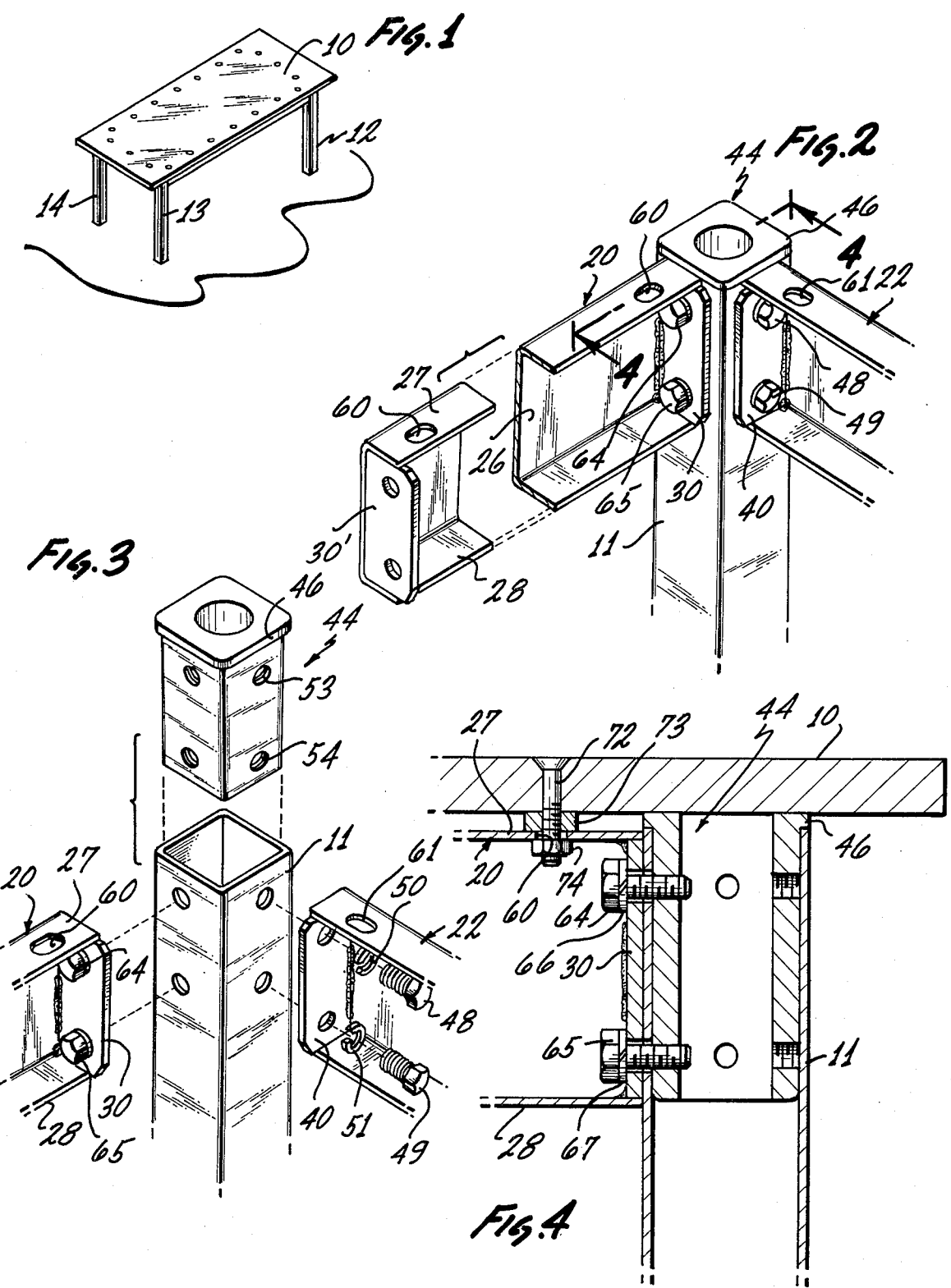

CONSTRUCTION OF METAL ARTICLES

BACKGROUND OF THE INVENTION

1. Field of the Invention

The field of the invention is that of construction of metal articles such as, for example, work benches, pallet racks, etc. The invention relates to the fabrication of the parts and to the joining of the parts to realize the finished structure.

2. Description of the Prior Art

Metal articles such as for example work benches, pallet, racks, etc., have been constructed in the past, but such prior art construction typically featuring weldments between upright members, that is, legs and lateral members, or otherwise joints between these members were secured by bolts. The prior art construction left considerable room for improvement in the fabrication of individual component members; and more particularly, in the simplification of making the joints between members. The known constructions lacked desired capability of dissasembly for purposes of transportation particularly that of removing a top, for example. The herein invention provides the needed improvements, all as described in detail hereinafter.

SUMMARY OF THE INVENTION

The invention is described in detail hereinafter with respect to an exemplary form which is a workbench. This particular article includes a flat platform or bench surface having legs which are secured to corners of the bench surface. The metal parts are preferably formed or fabricated by forming or stamping.

In the exemplary form of the invention, the metal legs are square in cross section. They are secured or joined at corners of the rectangular metal bench surface. Transverse members are provided which are metal members fabricated by stamping or forming. These members are channel members having side flanges. The transverse members have their ends secured to the square ends of the legs. Each end of a transverse member has a flat plate member welded to it between flanges in a position to be juxtaposed against a flat side of an end of a leg. An adjacent transverse member has a flat plate positioned to be juxtaposed against another flat side of the end of a leg. The transverse members are secured to the legs by stud bolts.

Fittings are provided in the form of plugs which may be castings of suitable material formed to fit into the top ends of the legs. Preferably these fittings or plugs have a central bore and a top flange, the flange coming down against the top edges of the leg. The welded plates at the ends of the transverse members have holes to receive the stud bolts which go through holes in the sides of the end of the leg and then the stud bolts thread into tapped holes in the side of the end plug. This results in an economical but sturdy and effective construction. The transverse members are secured to the legs without the need of a mounting plate inside of the legs and removal of the legs is made easy without removal of the top which is secured to the transverse members. The result is a metal article that is easy to fabricate, but is inexpensive and is extremely strong.

The primary object of the invention is to provide a technique making possible simplified fabrication of metal articles and to realize such articles having increased strength.

A further object is to realize the foregoing technique by way of utilization of formed upright members or legs of square cross sectional configuration associated with transverse members constructed to have end surfaces joined to ends of the legs by way of stud bolts.

A further object is to realize the construction as referred to in the foregoing by way of securement of legs to transverse channel members by securement of an end plate to the end of a leg and to an insert in the end of the leg.

A further object is to realize a construction as in the foregoing wherein the securement of transverse members to legs is by way of an end fitting or plug insertable into the end of the leg, the transverse member having a welded end plate which is attachable to the end of the leg and to the plug or fitting by way of stud bolts.

Further objects and additional advantages of the invention will become apparent from the following detailed description and annexed drawings:

BRIEF DESCRIPTION OF THE DRAWINGS

FIG. 1 is a pictorial isometric view of an exemplary form of article constructed in accordance with the invention;

FIG. 2 is an enlarged isometric view of one corner leg and joints of the article of FIG. 1;

FIG. 3 is an exploded view of the joint of FIG. 2.

FIG. 4 is a sectional view taken along the line 4—4 of FIG. 2.

DESCRIPTION OF THE PREFERRED EMBODIMENT AND BEST MODE

Referring now more particularly to the various figures of the drawings, FIG. 1 shows the exemplary article which has a flat metal bench surface 10 which is rectangular in shape. The article has uprights or legs shown more particularly in FIG. 2 and designated at 11, 12, 13 and 14. The legs 11–14 are joined side or transverse members two of which are designated at 20 and 22 in the Figures.

The legs 11–14 may be fabricated by stamping or forming from metal and are square in cross section as shown. The legs may have other cross sectional shapes.

The side or transverse member include two side members and two end members. These members are similarly constructed being fabricated from metal by stamping or forming. Referring to the member 20, it is constructed to provide a flat surface portion, the inside of which is designated at 26. Flange 27 has holes as shown at 26 for mounting the top 10.

FIGS. 2 and 3 shows the construction of the joint at one corner between transverse members 20 and 22 and the leg 11.

Numeral 30 designates a flat end plate that is welded to the end of the transverse member 20 between its side flanges 27 and 28 as shown. At the opposite end of the transverse member 20 is another welded end plate 30'.

At the end of the transverse member 22 is a similar welded end plate 40.

Numeral 44 designates an end fitting or end plug which may be a casting of alumimun or other material. As shown it has a cross sectional shape corresponding to or conforming with the shape of the leg. It fits into the end of the leg as shown, the fitting having a top flange 46 of a size to engage the top end of the leg 11. The end fitting 44 has tapped holes in two of its sides to receive stud bolts as will be described.

FIGS. 3 and 4 illustrates the joints formed by the assembly of the transverse members to the legs. As may be seen in FIG. 3, the end plate 40 at the end of the transverse member 22 can be secured to the end of leg 11 by way of stud bolts 48 and 49 which pass through washers 50 and 51 and through holes in the plate 40 and in the side of the leg 11 and then they are threaded into tapped holes 53 and 54 in the side of the fitting 44. The transverse member 20 is secured in the same manner. The members 20 and 22 have holes as shown at 60 and 61 in the top flanges. FIG. 4 shows the assembled parts in cross section. The plate 30 is secured by the stud bolts 64 and 65 extending through washers 66 and 67 and threaded into a side of the fitting 44.

The top flange 27 of the transverse member 20 is below the flange 26 of the fitting 44 as shown in FIGS. 2 and 4. The top is secured to the transverse members in a manner as illustrated in FIG. 4. Numeral 72 designates a bolt extending through a hole in the top through a washer 73 and through the hole 60 in the flange 27 of transverse member 20, and the bolt having a nut 74 on its end.

From the foregoing it can readily be seen that the construction as described provides a very strong, sturdy assembly. The top can readily be removed by unfastening the bolts such as shown at 72. Also the legs themselves can readily be removed or disconnected without removing the top if it is desired to do so simply by way of the stud bolts as described such as designated at 48, 49, 64 and 65.

The bottom ends of the legs may be closed by caps not shown which are then threaded to receive end buttons which may be made of metal with plastic inserts.

An important consideration is that the parts can be secured by stud bolts as shown by way of example at 64 and 65 in FIG. 4. The nature of the way of fabricating makes this possible.

From the foregoing, those skilled in the art will readily understand the nature and construction of the invention and the manner in which all of the objects as set forth in the foregoing are realized. All of the parts are fabricated using simplified procedures. The assembly of the finished article is simplified. Nevertheless an extremely strong, sturdy, and effective article is realized.

The foregoing disclosure is representative of a preferred form of the invention and is to be interpreted in an illustrative rather than a limiting sense, the invention to be accorded the full scope of the claims appended hereto.

I claim:

1. In the construction of metal articles having upright members and transverse members, in combination, an upright hollow member having an end part having flat side portions lying in planes, transverse channel members constructed to be secured to the end portion of the said upright member by way of joints, each transverse member terminating in joining means including at least one transverse portion closing the end of the channel and configurated to fit against a side of the end portions of the upright member, a fitting in the form of a plug positioned within the end of said upright member having tapped holes to receive securing means, a securing means securing the said joining means to said upright member and fitting said flat side portions of said member having flat inner surfaces, said plug having flat sides, each of said flat inner surfaces having flush engagement against a flat side of said plug.

2. A construction as in claim 1 wherein the end part of said upright member is square in cross section, said plug being square and of a size to fit snugly in said end part of the upright member.

3. A construction as in claim 1 wherein said joining means is constructed to provide a flat surface at the end of the transverse member positioned to fit against a surface of the upright member, and stud bolt means securing the joining means to the upright member and fitting.

4. A construction as in claim 3 wherein the said plug having tapped holes to receive stud bolts.

5. A construction as in claim 4 wherein said plug has top flange means positioned to fit against the top edges of the upright hollow member.

6. A construction as in claim 3 wherein each transverse member is of channel shape, said transverse portion of the transverse member being in the form of an end plate welded to the end of the channel shaped transverse member, the said stud bolts extending through the end plate.

7. A construction as in claim 1 including a second transverse member, the end part of the upright member providing a square cross section and the ends of the transverse members being secured to the end of the upright member in mutually perpendicular relationship.

* * * * *